United States Patent Office 3,716,493
Patented Feb. 13, 1973

3,716,493
PROCESS FOR MAKING FINE SIZED LOW DENSITY SILICA
Ellsworth G. Acker, Baltimore, and Milton Edward Winyall, Ellicott City, Md., assignors to W. R. Grace & Co., New York, N.Y.
No Drawing. Continuation of abandoned application Ser. No. 731,266, May 22, 1968. This application Feb. 26, 1971, Ser. No. 119,407
Int. Cl. B01j 13/00; C01b 33/16
U.S. Cl. 252—317
4 Claims

ABSTRACT OF THE DISCLOSURE

A solution of alkali metal silicate is partially neutralized with about 6% sulfuric acid to about pH 10.6–10.9, stirred vigorously and completely neutralized with more sulfuric acid. After neutralization is complete, ammonia is added until a pH of greater than 7 is obtained. The thus formed slurry is then aged at about 80° C. for about 1 hour and filtered. The residue is washed with about 0.1% ammonium carbonate solution at about 80° C. and the thus washed solids are sized and dried. The resultant silica gel has a bulk density of about 0.03–0.10 g./cc., and a surface area of about 200–400 m.$^2$/g.

---

This application is a continuation of application Ser. No. 731,266, filed May 22, 1969, and now abandoned.

This invention relates to a process for making silica. More specifically, this invention relates to a process for making fine sized, relatively low density silica.

Silica gel has found many commercial and industrial applications, and its low cost and high utility have led to widespread production However, several areas in which silica gel could be very useful have not been sufficiently exploited. Provided that a silica gel having a very low bulk density and at the same time an intermediate to relatively high surface area were conveniently and cheaply available, such a gel could be used extremely well as a paint flatting agent and in general as a resin thickening agent.

Several processes have heretofore enjoyed widespread use for making silica gel. Foremost of these has been the method for preparing acid-set silica gel. This process comprises neutralizing an aqueous alkali metal silicate solution with a strong mineral acid until a pH of about 1.5 has been reached. The thus acidified mixture then sets to a gel which is subsequently crushed to the desired particle size, washed with ammonia to remove the entrapped salts, and dried. Fine sized gels resulting from such a process generally have a bulk density of about 0.25 g./cc. and a surface area of about 300 m.$^2$/g. These gels are also very hard and hence difficult to size into fine particles.

It would therefore be desirable and advantageous to be able to obtain readily a silica gel having a bulk density of about 0.03 to 0.10 g./cc. and a surface area of about 200 to 400 m.$^2$/g., and which lends itself readily to sizing into particles of about 0.5 to 20 microns.

It is therefore an object of this invention to provide an improved process for making silica gel.

A further object of this invention is to provide a process for making a silica gel having a relatively low bulk density, intermediate to relatively large surface area, and which is easily sized into fine particles In summary, this invention is a process for making silica gel having a bulk density of about 0.03–0.10 g./cc. a surface area of about 200–400 m.$^2$/g., and which can be sized to particles of about 0.5–20 microns. The process comprises:

(1) Preparing an aqueous alkali metal silicate solution;

(2) Partially neutralizing said solution to a pH of about 10.6–10.9 to obtain an alkaline silica hydrosol;

(3) Permitting said hydrosol to set to a gelatinous mass of alkaline-set hydrogel;

(4) Agitating said gelatinous mass to obtain a slurry of finely divided particles of alkaline-set hydrogel;

(5) Adding additional acid to said slurry of alkaline-set hydrogel to completely neutralize said alkali metal silicate in said slurry;

(6) Making the thus neutralized slurry alkaline by adding aqueous ammonia;

(7) Aging said ammoniacal slurry to obtain a slurry of aged silica hydrogel particles;

(8) Washing said aged hydrogel particles to obtain salt-free silica hydrogel particles; and (9) Drying said salt-free particles to obtain silica gel having a bulk density of about 003–0.10 g./cc., a surface area of about 200–400 m.$^2$/g., and which can be easily sized to about 0.5–20 microns.

Any alkali metal silicate may be used as the silica source for this invention, but preferably sodium silicate is employed. The aqueous silicate solutions contemplated may be about 15–24% $SiO_2$ by weight and are typically about 20% $SiO_2$ by weight.

The initial neutralization is accomplished by adding a strong mineral acid to the aforementioned silicate solution until said solution has a pH of about 10.6–10.9. Typically, enough 4–9% sulfuric acid is added to the solution to result in a pH of about 10.8.

This alkaline silica hydrosol will then set to a hydrogel. Before said hydrogel becomes hard, and while it is in an easily dispersible, gelatinous state, it should be vigorously physically agitated, thereby disintegrating it into very fine gelatinous particles and dispersing same to form a slurry. Said physical agitation is best performed by any means of a rapid-stirring apparatus.

When a fine slurry of gel particles has been formed, enough mineral acid is added to at least neutralize all of the alkali metal silicate initially present, and preferably, a 20% excess of said acid is added. Typically, enough about 6% aqueous sulfuric acid is added to bring the pH of the resultant slurry to about 0.5–4.

The thus neutralized silica gel slurry is made alkaline by adding enough aqueous ammonia to cause a pH greater than 7.0. In a preferred embodiment of this invention, an aqueous ammonia solution of about 20% $NH_3$ by weight is added until the resulting slurry has a pH of about 8–10.5.

Aging of the thus formed ammoniacal slurry is accomplished by stirring said slurry for about 0.5–1.5 hours at a temperature of about 60–95° C. Typically aging is done in a closed container to preclude the evaporation of water, although this technique is not mandatory for successful aging.

Any suitable means may be employed to separate the suspended solid phase from the ammoniacal liquid phase of the slurry. Some such means which are practical are filtration, centrifugation, and decantation. We have found filtration especially applicable to this invention because the separated solids can then easily be washed free of residual salts while said solids are still retained on the filter.

It is important that the thus separated silica gel particles be washed free of residual salts. Said salts are primarily those formed during the aforementioned neutralization process. In the case where sulfuric acid is the mineral acid employed for neutralization, said salts consist essentially of alkali metal sulfate. Salt removal can be effectively achieved by washing with hot (about 60–95° C.) water and preferably with hot (about 60–95° C.) about 1.5% aqueous ammonium sulfate solution. A particularly effective washing technique is initially washing with hot aqueous ammonia sulfate, as stated supra, followed by washing with hot (about 60–95° C.), about 1.5% aqueous ammonium carbonate solution.

Drying of the desalted silica gel may be accomplished at any temperature sufficient to remove moisture therefrom. Preferably, the temperature should be high enough to decompose any residual ammonium carbonate, i.e. greater than 58° C.; and ideally said drying is performed at about 100–250° C.

It is important that said drying operation be carried out as rapidly as possible, for example, within about three minutes. Slow drying, for example in an oven at a temperature of about 100–150° C., requires about 15–20 minutes to complete drying. Drying of the silica gel in this manner does not give the desired relatively low density and relatively high surface area. Typical of methods employed to achieve said rapid drying, and hence to achieve said relatively low density and said relative high surface area:

(1) Spray drying (requiring about 3 seconds).
(2) Fluid energy milling (requires about 1 second).

Hence, by rapidly drying the gel is meant subjecting said gel to a drying process requiring not longer than about 3 minutes to achieve complete drying.

The silica gel resulting from the hereinbefore described process is characterized by having a bulk density of about 0.03–0.10 g./cc., and a surface area of about 200–400 m.$^2$/g. Said silica gel may be further characterized as having a pore volume of about 1.5–2.5 cc./g.

By sizing of the silica gel encompassed by the instant invention is meant any means of changing the average size of the particles resulting from the aforementioned process. For example, silica gel made by the process herein described can be easily ground in a fluid energy mill to an average particle size of about 0.5–1.5 microns. If particles larger than those resulting from this process are desired, said larger particles may be prepared by spray drying. Using this technique, particles up to about 20 microns can be prepared.

The following examples are provided to further describe and point out the various aspects of this invention. They are not intended to in any way limit or narrow the scope of said invention.

EXAMPLE 1

A solution of 2500 ml. of 40° Bé sodium silicate (about 28% $SiO_2$) was diluted with 1500 ml. of water to form a solution of about 20% $SiO_2$. A solution of sulfuric acid, prepared by diluting 100 ml. concentrated (about 35.9 N) with 2900 ml. $H_2O$, was added to the stirred sodium silicate solution to form an alkaline silica hydrosol having a pH of about 10.8. After all the acid was added, the sol was allowed to gel. After about 15 minutes, a soft gel had set and further stirring dispersed said gel into a slurry of very fine gel particles. A second solution of sulfuric acid, prepared by diluting 250 ml. concentrated $H_2SO_4$ (about 35.9 N) with 6000 ml. water, was then added to the alkaline silica gel slurry and the mixture was heated to about 80° C. The resultant acidic hydrogel slurry had a pH of about 2.0. Next, 400 ml. concentrated aqueous ammonia (30% $NH_3$) was added to said acidic hydrogel slurry to form an alkaline hydrogel slurry having a pH of about 9.0. This slurry was then aged at about 80° C. for about 1 hour and filtered on a Buchner funnel using partial vacuum. The collected solids were then washed with a solution of about 0.5% ammonium carbonate at about 80° C. The thus washed silica gel particles were then mixed with enough water to form a slurry having about a 7% by weight silica content and spray dried at 165° C.

EXAMPLE 2

The procedure of Example 1 was repeated except the filtered particles were washed with about 0.1% ammonium sulfate solution at about 80° C., then washed with about 0.1% ammonium carbonate solution at about 80° C., and dried in a fluid energy mill.

EXAMPLE 3

The spray dried silica gel of Example 1 had a particle size of about 1–40 microns, a surface area of about 215 m.$^2$/g., a pore volume of about 2.5 cc./g., and a bulk density of about 0.04 g./cc.

The fluid energy milled silica gel of Example 2 had an average particle size of about 1 micron, a surface area of about 250 m.$^2$/g., a pore volume of about 1.8 cc./g., and a bulk density of about 0.03 g./cc.

Because of the properties unique to the silica gel prepared in this invention (i.e. very low bulk density, intermediate to relatively high surface area, and ease of sizing) said gel lends itself readily to many useful applications. It is particularly adaptable to use as a paint flatting agent, as an anticaking additive in comestible preparations such as dry cake mixes, and as an anti-offset agent in the printing industry. Other uses include as resin filler and thickening agents.

What is claimed is:

1. A process for making silica gel having a bulk density of about 0.03–0.10 grams per cc., a surface area of about 200–400 m.$^2$/g., and which can be sized to particles of about 0.5–20 microns, said process comprising:
   (a) preparing an aqueous solution of alkali metal silicate having a $SiO_2$ content of from 15–24 percent;
   (b) reacting aqueous acid and said alkali metal silicate solution to obtain an alkali silica hydrosol having a pH of about 10.6–10.9;
   (c) permitting said alkaline silica hydrosol to set to a gelatinous mass of alkaline-set hydrogel;
   (d) agitating said gelatinous mass to obtain a slurry of finely divided particles of alkaline-set hydrogel;
   (e) reacting aqueous acid and said slurry of alkaline-set hydrogel until essentially all of said alkali metal silicate has been neutralized to obtain a completely neutralized silica hydrogel slurry;
   (f) making the thus neutralized silica hydrogel slurry alkaline by adding aqueous ammonia solution until a pH of greater than about 7.0 is attained, thus obtaining an ammoniacal silica hydrogel slurry;
   (g) aging the thus formed ammoniacal slurry at about 60–95° C. for about 0.5 to 1.5 hours to obtain an aged silica hydrogel slurry;
   (h) separating the solids suspended in said aged silica hydrogel slurry from the ammoniacal aqueous phase to obtain aged silica hydrogel particles;
   (i) washing said aged particles to remove alkali metal salts therefrom, thereby obtaining substantially salt-free silica hydrogel particles; and
   (j) rapidly drying said substantially salt-free particles to obtain silica gel having a bulk density of about 0.03–0.10 grams per cc., a surface area of about 200–400 m.$^2$/g., and which can be sized to about 0.5–20 microns.

2. The process of claim 1 wherein said aged silica hydrogel particles are washed with an aqueous ammonium sulfate solution of about 1.5 percent by weight of ammonium sulfate at a temperature of about 60–95° C.

3. The process of claim 2 wherein said ammonium sulfate washing is followed by a subsequent washing comprising washing the ammonium carbonate solution of about 1.5 percent ammonium carbonate at a temperature of about 60–95° C. to obtain salt-free silica hydrogel particles.

4. A process for making silica gel having a bulk density of about 0.03–0.10 grams per cc., a surface area of about 200–400 m.$^2$/g., and which can be sized to particles of about 0.5–20 microns, said process comprising:
   (a) preparing an aqueous solution of sodium silicate having an $SiO_2$ content of about 20 percent by weight;

(b) neutralizing said sodium silicate solution to about 10.6–10.9 pH with about 4–9 percent aqueous sulfuric acid thereby forming an alkaline silica hydrosol which is permitted to set to a slurry of alkaline-set silica hydrogel;

(c) neutralizing said slurry of alkaline-set hydrogel to a pH of about 0.5–4.0 with about 4–9 percent aqueous sulfuric acid thereby forming an acidic silica hydrogel;

(d) adding an aqueous ammonia solution of about 20–30 percent $NH_3$ by weight to the acidic silica hydrogel, until a pH of about 8–10.5 is attained;

(e) aging the thus obtained ammoniacal silica hydrogel slurry at a temperature of about 60–95° C. for about 0.5–1.5 hours;

(f) washing said aged particles with an aqueous ammonium sulfate solution of about 1.5 percent by weight of ammonium sulfate at a temperature of about 60–95° C. to obtain partially washed silica hydrogel particles;

(g) further washing said silica gel particles with an aqueous ammonium carbonate solution at a temperature of about 60–95° C. to obtain substantially desalted silica hydrogel particles; and (h) rapidly drying said substantially desalted silica hydrogel particles at a temperature sufficient to decompose any residual ammonium carbonate in said particles.

References Cited

UNITED STATES PATENTS

| | | | |
|---|---|---|---|
| 1,935,176 | 11/1933 | Connolly | 23—182 RX |
| 2,477,695 | 8/1949 | Kimberlin, Jr. | 252—317 X |
| 3,453,077 | 7/1969 | Hyde | 252—451 X |

RICHARD D. LOVERING, Primary Examiner

U.S. Cl. X.R.

106—288 B; 252—385; 423—338